UNITED STATES PATENT OFFICE.

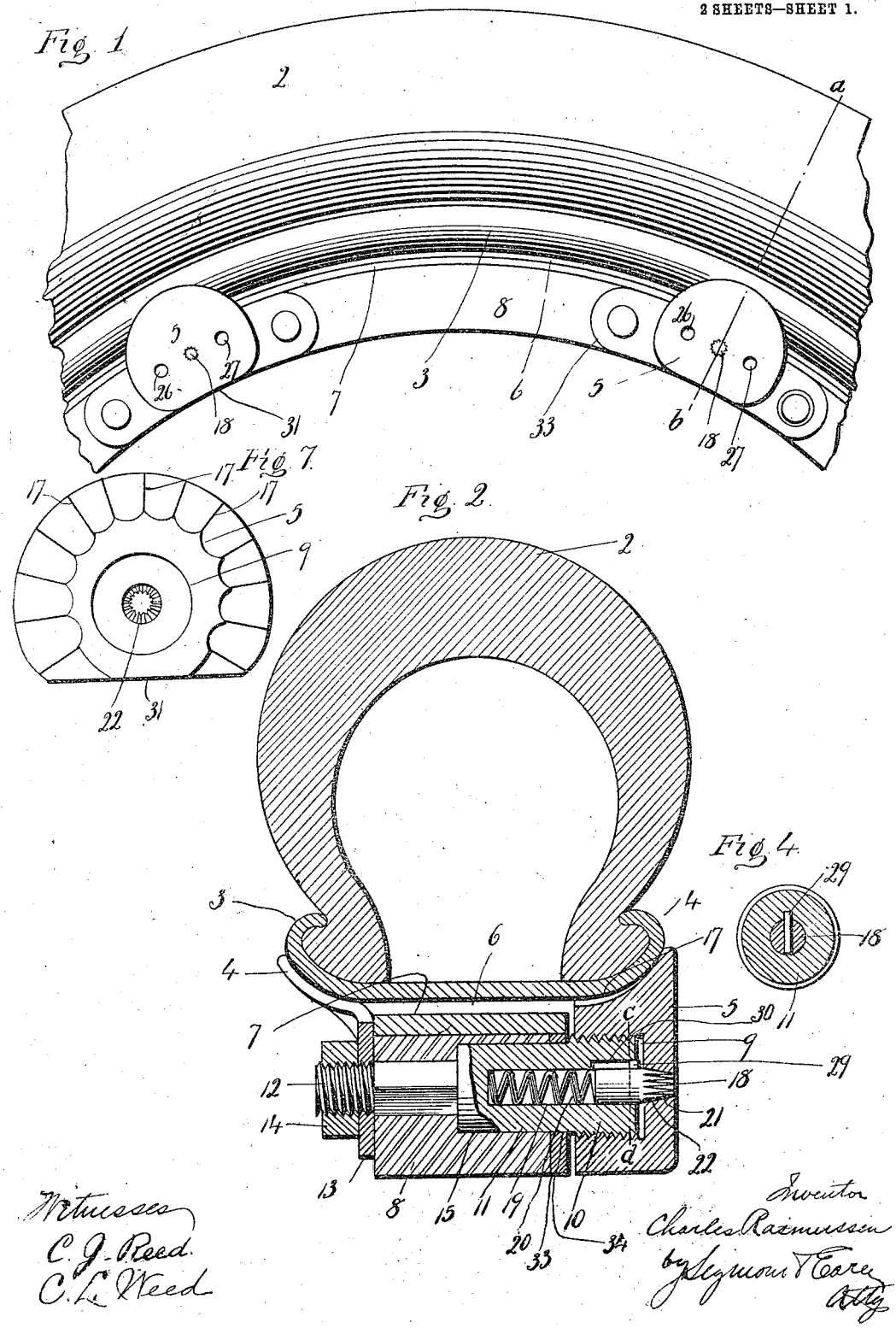

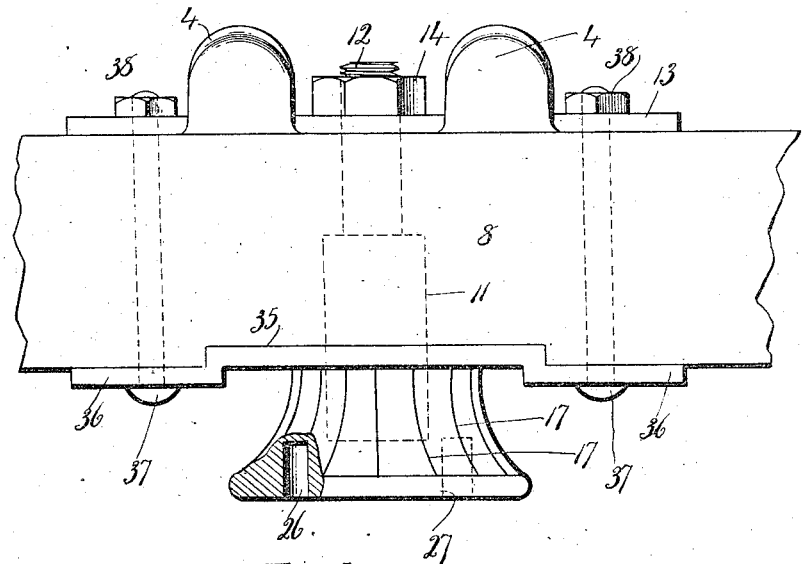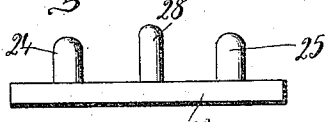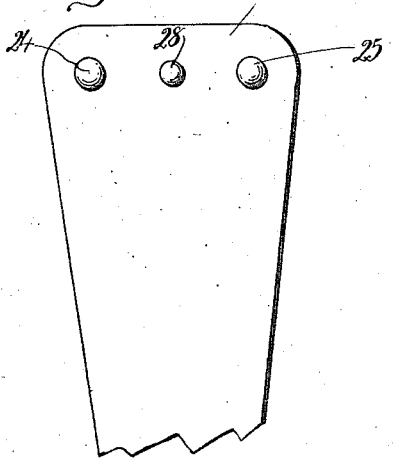

CHARLES RASMUSSEN, OF NEW HAVEN, CONNECTICUT, ASSIGNOR OF ONE-HALF TO PAUL W. STEINBECK, OF NEW HAVEN, CONNECTICUT.

AUTOMOBILE-WHEEL.

965,539.   Specification of Letters Patent.   Patented July 26, 1910.

Application filed December 18, 1909. Serial No. 533,786.

*To all whom it may concern:*

Be it known that I, CHARLES RASMUSSEN, a citizen of the United States, residing at New Haven, in the county of New Haven and State of Connecticut, have invented a new and useful Improvement in Automobile-Wheels; and I do hereby declare the following, when taken in connection with the accompanying drawings and the numerals of reference marked thereon, to be a full, clear, and exact description of the same, and which said drawings constitute part of this specification, and represent, in—

Figure 1, a broken view in side elevation on a reduced scale of an automobile wheel constructed in accordance with my invention. Fig. 2 a view thereof in transverse section on the line $a$—$b$ of Fig. 1. Fig. 3 a broken plan view of the wheel from which the tire and its clencher-rim have been removed and looking directly down upon one of the locking cams and its related parts. Fig. 4 a view in vertical section on the line $c$—$d$ of Fig. 2, showing the chambered bolt-head and locking plunger therein. Fig. 5 a detached end view of the wrench employed to turn the locking-cams. Fig. 6 a broken face view thereof. Fig. 7 a detached view in inside elevation of one of the locking cams.

My invention relates to an improvement in that class of automobile wheels the tires of which are mounted upon and demounted from the wheel rims by a simple lateral movement, the object being to provide durable and convenient means whereby a tire may be demounted and replaced with the minimum amount of time and labor.

With these ends in view my invention consists in an automobile wheel having certain details of construction and combinations of parts as will be hereinafter described and pointed out in the claims.

In carrying out my invention as herein shown, the pneumatic tire 2 is mounted in a channel-iron or clencher-rim 3 which may be of any approved construction. This rim is supported on the one hand by a series of fixed back-stops 4 and upon the other hand by a series of independently organized and operable locking-cams 5. The said back-stops 4 and cams 5 are constructed and arranged so as to support the clencher-rim 3 as it were upon points with a space 6 between the inner face of the rim and an iron band 7 embracing the felly 8 of the wheel. The rim 3 is thus prevented by the narrow space 6 from coming in contact with the band 7 so that the rusting of these surfaces is prevented. This is important as one of the difficulties heretofore experienced with laterally demountable automobile tires has been that in a few weeks' time the parts rust together and prevent the easy demounting of the tire.

A description of one of the independently organized and operable locking-cams 5 will suffice for all. Each of these cams is formed in its inner face with an internally threaded circular chamber 9 adapting the cam to be rotatably mounted upon the externally threaded projecting outer end of the long head 10 of a bolt 11 the threaded stem 12 of which projects through the flange 13 of the back-stop 4 and receives a nut 14 which bears upon the outer face of the said flange 13. The said head 10 and bolt 11 are mounted in the felly 8 which is formed with a chamber 15 for the purpose. Under this construction the bolt 11 provides a mounting, on the one hand, for the locking-cam 5, and, on the other hand, secures the back-stop 4 in place. By preference, and as shown, the inner face of the cam is broken into a series of facets to provide bearing-points 17 separated from each other by the width of the respective facets, whereby each of the locking-cams 5 presents two of the bearing-points 17 to the clencher-rim 3, the effect being to assist in holding the cams against rotation. The faceted inner face of the cam forms the cam proper and eccentric to the axis of the bolt-head 10 and bolt 11.

For the purpose of positively locking the locking-cams against rotation, I locate a locking-plunger 18 in the outer end of a counterbore 19 in the long bolt-head 10, the inner end of the said counterbore 19 being occupied by a helical spring 20 which exerts a constant effort to push the locking-plunger outward for the engagement of its tapering and toothed outer end 21 with the corresponding teeth of a tapering opening 22 passing through the outer face of the cam 5 and intersecting the chamber 9 thereof. The outer end of the plunger 18 is exposed through the opening 22 as shown in Figs. 1 and 2. To unlock the cam the plunger is pushed inward against the tension of its spring 20 by any convenient instrument until the teeth upon the tapered end 21 have been entirely cleared from the teeth in the wall of the tapering opening 22, whereby the cam 5 is freed for rotation which cannot, however, be effected except as sufficient force is employed to ride the high bearing-points 17 of the faceted inner face of the cam over the adjacent portions of the outer face of the clencher-rim 4. As soon, however, as inward thrust is removed from the plunger 18, the spring 20 asserts itself and pushes the plunger outward whereby the teeth upon its tapered outer end are reëngaged with the teeth of the opening 22 in the cam 5, whereby the same is positively locked against rotation.

To operate the cams, I by preference employ a flat plate-like wrench 23 carrying fixed inwardly projecting pins 24, 25, adapted to enter suitable pin-holes 26 and 27 formed in the flat outer face of each cam 5 and spaced in correspondence with the spacing of the said pins 24 and 25 between which I locate a corresponding pin 28 adapted to enter the outer end of the said hole 22 and force the plunger 18 sufficiently inward to entirely clear the teeth upon its outer end from the teeth of the hole 22. As soon as the wrench is removed from the cam, the spring 20 reasserts itself to restore the plunger 18 to its locked position. A feather 29 upon the plunger 18 enters a groove 30 leading out of the bore 19 and holds the plunger itself against rotation. The plunger in turn holds the cam against rotation and is assisted in that office by the action of the clencher-rim 3 upon the bearing-points 17 upon the inner face of the cam.

The cams 5 are constructed so that when rotated to bring their lowest points 31 outward, the clencher-rim 3, and hence the tire 2, will slide laterally over them. For this reason the point 31 may with propriety be called the demounting point of the cam. On the other hand, when the cam is turned and its higher portion 32 brought into play, it not only supports the clencher-rim 3, but also prevents its lateral movement in the direction of demounting, the action of the cam proper being to crowd the clencher-rim 3 laterally outward against the back-stop 4. Each cam will be turned more or less, of course, according to the fit of the parts in its particular locality, and as the cams are independently organized and operable, they will be turned and set as may be required to meet different conditions throughout the tire, very slight inequalities of construction, form or wear making it desirable that the cams shall be independently set in order to secure the best results.

Let it be supposed that it is desired to demount the tire 2 from the wheel: all of the cams 5 will be locked one by one and turned into their demounting positions after which the tire will be slipped laterally inward over them. A new tire is then slipped laterally outward over them until the outer edge of the clencher-rim rests upon the back-stops 4 as shown in Fig. 2. The cams will now be turned more or less as may be required to seat them firmly upon the inner edge of the clencher-rim 3, whereby the rim and hence the tire will be supported and secured in place. Each of the locking-cams 5 is provided with a bearing-plate 33 formed with a circular opening 34 for the outward passage through it of the bolt head 10 and set into a recess 35 in the inner face of the felly 8 the ends of the said plate 33 being provided with perforated lugs 36 receiving bolts 37 passing through the felly and through the ends of the flange 13 of the back-stop, the projecting ends of the bolts being provided with nuts 38 as shown in Fig. 3, brought to a bearing upon the outer face of the flange and thus assisting the bolt 11 in holding the same in place.

I claim:—

1. In an automobile wheel, the combination with the felly, tire and clencher-rim thereof, of a series of rotatable locking-cams carried by the felly and each cam having its inner face provided with a curved series of facets for engagement with the said rim.

2. In an automobile wheel, the combination with the felly, tire and clencher-rim thereof, of a series of rotatable locking-cams carried by the felly and adapted to engage with the clencher-rim, a locking plunger extending outwardly into each cam for locking it against rotation, and means for supporting the plunger and holding it against rotation.

3. In an automobile wheel, the combination with the felly, tire and clencher-rim thereof, of a series of bolts mounted transversely in the felly, a series of locking cams respectively mounted upon the said bolts, and plungers non-rotatably mounted in the said bolts and engaging with the said cams for locking the same against rotation.

4. In an automobile wheel, the combination with the felly, tire and clencher-rim thereof, of a bolt mounted in the felly and provided with a long head projecting from the felly, externally threaded and having a longitudinal bore, a locking-cam rotatably mounted upon the said bolt, and a spring-actuated locking plunger mounted in the bore of the head of the bolt and projecting outwardly through an opening in the cam with which it engages to hold the same against rotation.

5. In an automobile wheel, the combination with the felly, tire and clencher-rim thereof, of a series of bolts transversely mounted in the said felly, independent back-stops and rotatable locking-cams respectively mounted upon the projecting ends of the bolts, and spring-actuated non-rotatable locking-plungers mounted in the said bolts and extending outward therefrom into each cam from the inside thereof and operated through the outer face thereof for locking the cams against rotation.

6. In an automobile wheel, the combination with the felly thereof, of a rim demountable from the felly by sliding it laterally with respect thereto, a series of independently organized and operable cams carried by the felly and coacting with the rim for supporting it and retaining it in its mounted position, each of the said cams being formed with a toothed opening, and a spring-actuated locking-plunger extending into each cam from the inside thereof and formed at its outer end with teeth for coaction with the teeth of the opening in the cam through which the plunger is pushed back to release the cam for its rotation.

In testimony whereof, I have signed this specification in the presence of two subscribing witnesses.

CHARLES RASMUSSEN.

Witnesses:
C. L. WEED,
CLIFFORD J. REED.